(12) United States Patent
Ishitobi et al.

(10) Patent No.: US 7,095,680 B2
(45) Date of Patent: Aug. 22, 2006

(54) METHOD AND APPARATUS FOR DISC RECORDING

(75) Inventors: Tatsuya Ishitobi, Kawasaki (JP); Hiroaki Ono, Mito (JP)

(73) Assignee: Hitachi, Ltd., Tokyo (JP)

( * ) Notice: Subject to any disclaimer, the term of this patent is extended or adjusted under 35 U.S.C. 154(b) by 133 days.

(21) Appl. No.: 10/911,967

(22) Filed: Aug. 4, 2004

(65) Prior Publication Data
US 2005/0007915 A1      Jan. 13, 2005

Related U.S. Application Data

(63) Continuation of application No. 09/944,466, filed on Aug. 30, 2001, now Pat. No. 6,982,938.

(30) Foreign Application Priority Data
Jun. 7, 2001     (JP) ............................. 2001-171890

(51) Int. Cl.
    *G11B 21/08* (2006.01)
(52) U.S. Cl. ................. 369/30.01; 369/124.08
(58) Field of Classification Search ...................... None
    See application file for complete search history.

(56) References Cited

U.S. PATENT DOCUMENTS 5,206,847 A     4/1993     Kanda

FOREIGN PATENT DOCUMENTS

| JP | 10-063433  | 3/1998  |
|----|------------|---------|
| JP | 11-203785  | 7/1999  |
| JP | 11-345462  | 12/1999 |

*Primary Examiner*—Paul W. Huber
(74) *Attorney, Agent, or Firm*—Townsend and Townsend and Crew LLP

(57) ABSTRACT

A disc device in which recording is possible in a basic recording area in units of a subarea and startable at any position. Even if the recording cannot help stopping due to some external cause during recording on a disc-type recording medium that basically employs real-time sequential recording, the recording is re-openable at the position where the recording stopped when the external cause has disappeared. The disc device includes a reference clock counter that starts to count at the starting point of each basic recording area reference clocks read from the disc, and an address memory that holds an address of the basic recording area under recording. When the recording is stopped due to some external cause, the count of the counter and the address held by the address memory at that time are saved.

3 Claims, 4 Drawing Sheets

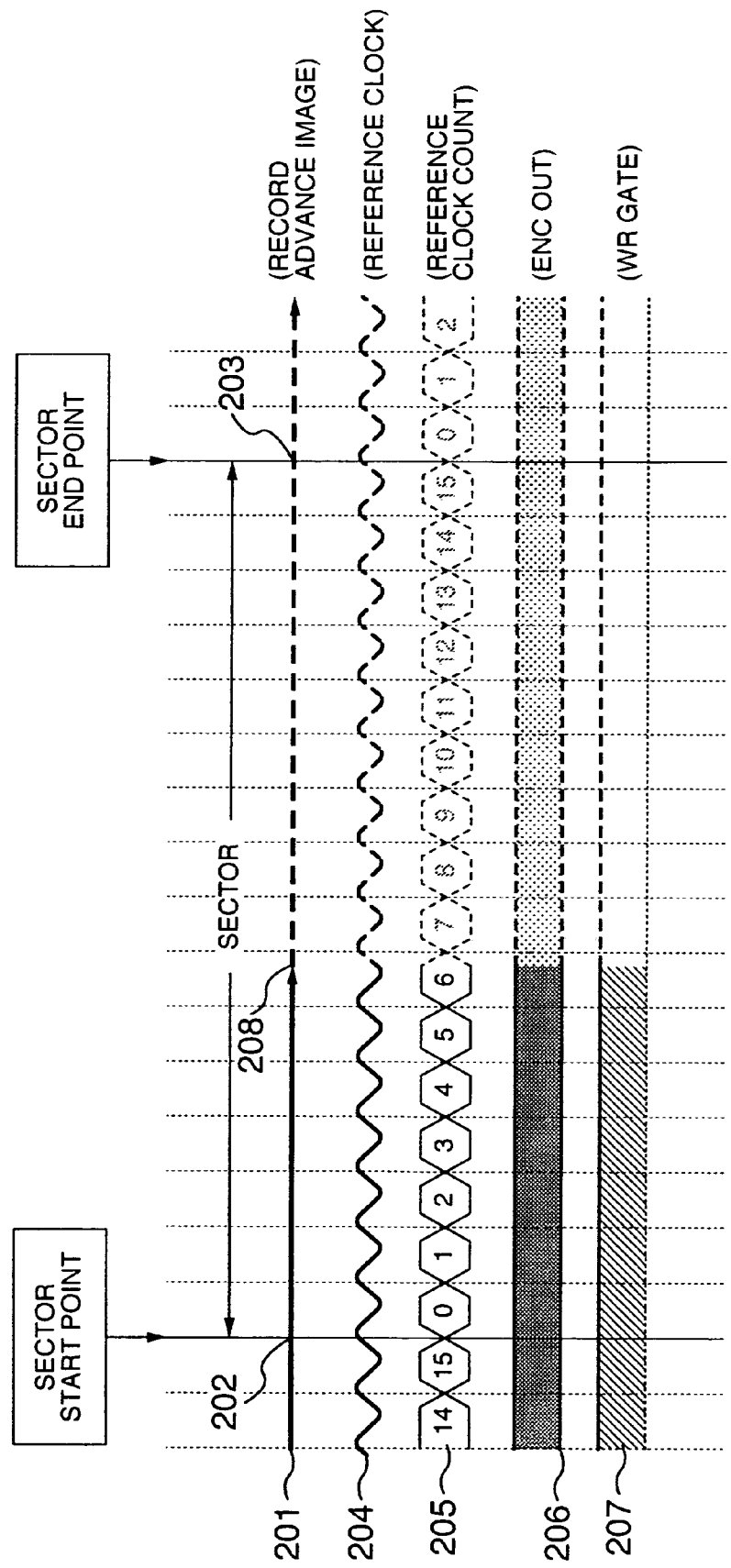

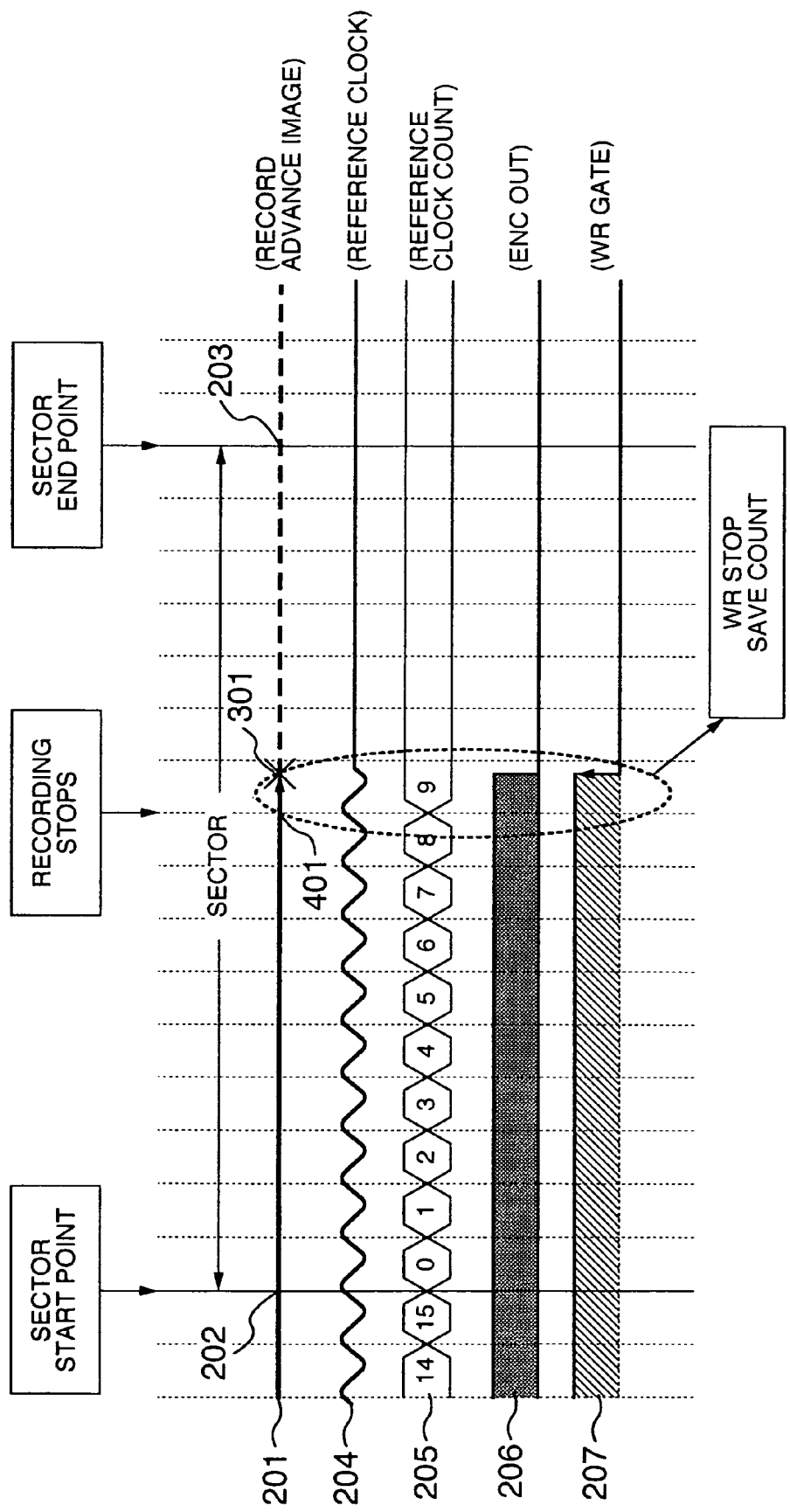

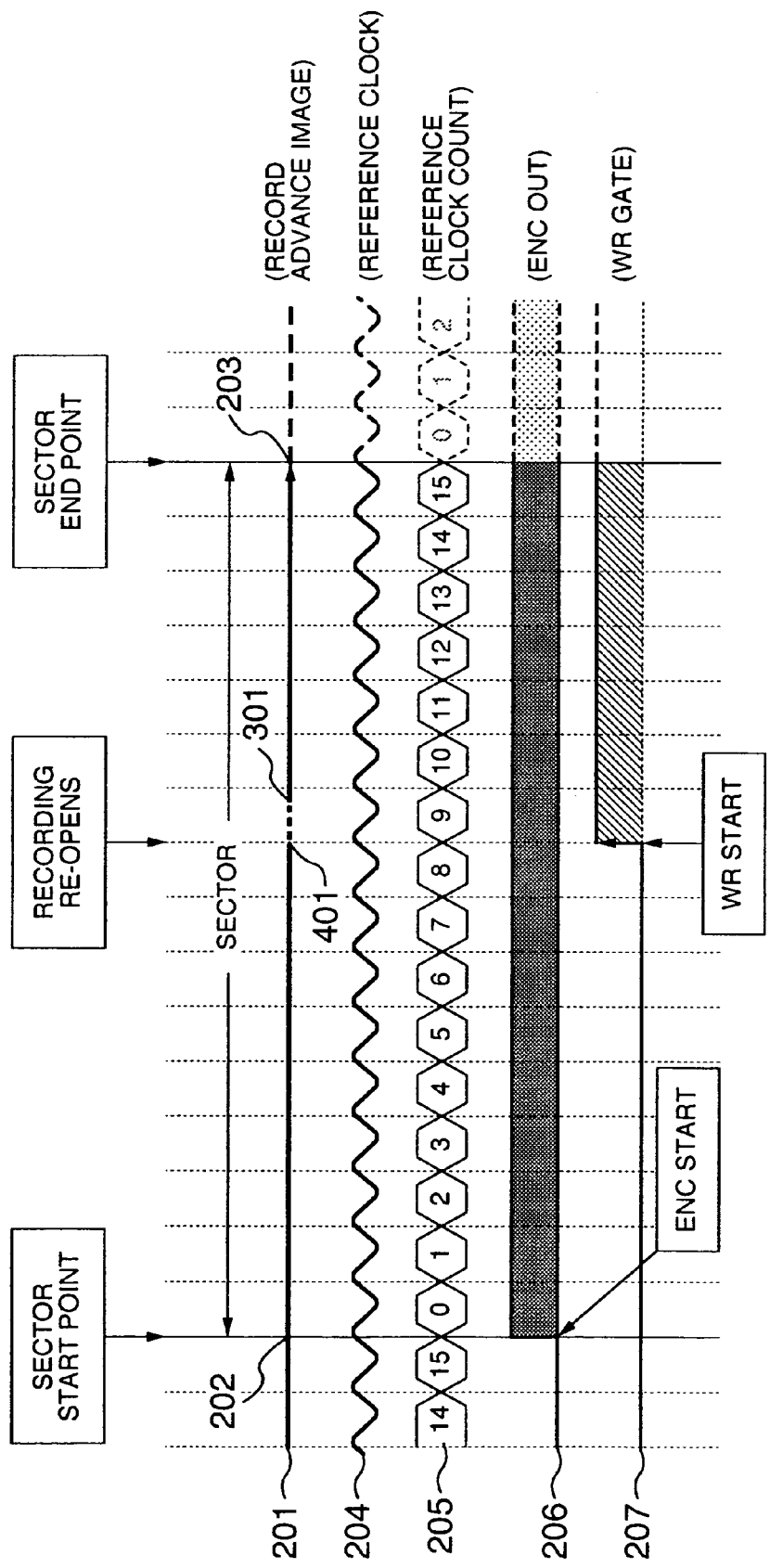

METHOD AND APPARATUS FOR DISC RECORDING

This application is a continuation of U.S. application Ser. No. 09/944,466, filed Aug. 30, 2001, now U.S. Pat. No. 6,982,938.

BACKGROUND OF THE INVENTION

The present invention relates to a disc recording method and an apparatus using the method.

In the conventional disc device, a position where recording starts is fixed to a point in a basic recording area such as a sector prescribed according to disc standards, and neither recording nor a start of recording at any position in any one of unit subareas of the basic recording area has been considered.

Thus, when recording cannot help stopping at an unexpected position in any basic recording area due to some external cause such as buffer under-run/vibrations or shocks during recording in a disc-type recording medium such as especially a DVD-R or DVD-RW that basically employs sequential recording, the disc must be exchanged with another or re-recording must be performed, in order to cope with such accident.

For example, when the disc device stops its recording at an unexpected position due to some external cause during Disc-at-Once recording on a write once-type DVD-R, this disc must be discarded and re-recording must be made on a new disc from the beginning. When recording stops at an unexpected position in a rewritable DVD-RW, data recorded before the stoppage of the disc must be erased from the disc and re-recorded on the disc.

The Disc-at-Once recording (hereinafter referred to as DAO recording) will be described. The DAO recording implies sequential recording at a stroke without additionally recording data halfway from the Lead-in to the Lead-out, irrespective of the number of times of being data rewritable (for example, a DVD-R rewritable only once, a DVD-RW rewritable about 1000 times).

In contrast to the DAD recording, a recording method in which new data is sequentially recorded after the recorded data from the Lead-in to the Lead-out (or recorded continuously in a linking manner) is referred to as incremental recording. (In the incremental recording, seams are produced whereas in the DAD recording no seams are produced. The DAD recording points to a recording method and not whether or not the disc is rewritable.)

Of course, there are several conventional disc devices that start to record at a position other than the starting position of a basic recording area. One of them is, for example, the linking process that includes additionally recording new data after the recording data in the sequentially recording in a recording medium such as, for example, a DVD-R or DVD-RW. The linking process does not start to record at the exact starting point or at any position in the basic recording area, but to record at a specified position prescribed according to the disc standards.

There is another conventional recording device that starts to record not at a position that is prescribed according to the disc standards but at a position other than the starting position in the basic recording area in order to cope with a buffer underrun (JP-A-10-63433). When a quantity of data remaining in the buffer memory decreases below a prescribed quantity, the disc device itself stops its recording at a specified position beforehand set peculiarly in the basic recording area, and re-starts to record at the position where the recording stopped when the quantity of data remaining in the buffer memory is recovered.

At any rate, in the conventional device the start of the recording at the position other than the start position in the basic recording area is performed at a specified position, strictly speaking. Thus, when the recording stops at an unexpected position due to some external cause such as external vibrations/shocks, the device is not adapted to re-start the recording at the position where the recording stopped.

Also, in the incremental recording when the conventional device stops its recording at an unexpected position, it performed a repair process including apparently erasing the sequential recorded portion where the recording has stopped. Thus, the recording cannot re-start. In the linking process or in the process that cope with the buffer underrun, a useless area is needed on the recording medium for continuing the recording.

As described above, the conventional device need much time to return from a stoppage of the recording at an unexpected position in the disc-type recording medium which basically employs the sequential recording. This is especially a hindrance to application of a disc-type recording medium, which basically employs sequential recording, to a real-time recording system that records, for example, a video image on a real-time basis. Since in the real-time recording system information itself that is being recorded becomes an original source, re-recording the information from the beginning after the recorded information is erased, and exchange of the disc under use with a new one cannot be admitted even when the recording cannot help stopping due to some external cause. For such reasons, the real-time recording system using the conventional disc device is difficult to perform stabilized recording unless a randomly accessible recording medium such as DVD-R or DVD-RW is used. Thus, a disc-type recording medium such as DVD-R or DVD-RW that basically employ sequential recording is difficult to employ in the real-time recording system although it is inexpensive compared to the DVD-RAM.

SUMMARY OF THE INVENTION

The present invention provides techniques for enabling recording, or its opening at any position, in any unit area such as a sector in a basic recording area of a disc device prescribed according to the disc standards, and when the recording cannot help stop due to some external cause, for enabling the recording to re-start at the position where the recording stopped irrespective of the position where the recording stopped.

It is an object of the present invention to re-open recording, basically comprising sequential recording being performed on a relevant disc-type recording medium and stopped due to some external cause, at the position where the recording was stopped when the external cause has disappeared, thereby achieving the recording without re-recording from the beginning by erasing the information recorded before the recording was stopped, and without exchanging the disc. Another object of the present invention is to realize stabilized recording that basically comprises sequential recording on a relevant disc-type recording medium in a real-time recording system using a disc device.

In order to achieve the above objects, the present invention provides a disc recording method comprising the steps of:

sub-dividing each of first basic recording areas of a disc, to which the disc is divided by a basic recording unit, into second basic recording areas; and using each of the second basic recording areas as a unit for record control.

The sub-division of each of the first basic recording areas into the second basic recording areas may be made based on the same number of first clocks reproduced from the respective first basic recording areas or second clocks obtained by either multiplying or dividing the frequency of the first clocks.

The disc may employ sequential recording basically, and each first basic recording area may be obtained by dividing the disc by the basic recording unit according to the disc standards.

The unit of each second basic recording area may be in a range correctable by an ECC (Error Correction Code) block added to data.

According to another aspect, the present invention provides a disc recording method/device comprising the steps of/means for:

starting to count clocks reproduced from each of basic recording areas, as a basic recording unit, of the disc prescribed according to disc standards, the respective basic recording areas reproducing the same number of first clocks, or to count second clocks obtained by multiplying or dividing the frequency of the first clocks, at the starting point of the basic recording area;

adding the obtained count to an address allocated to the relevant basic recording area;

detecting a particular basic recording area of the disc and a particular position in the particular basic recording area based on a result of the addition of the count and the address; and controlling based on a result of the detection a position in the basic recording area where recording starts, in units of a sub-area obtained by sub-dividing the basic recording area.

The disc recording method/device may further comprise the steps of/means for:

storing the count in the basic recording area recorded so far and the address of the basic recording area when the recording becomes stopped due to some external cause in the basic recording area during recording; and locating the position where the recording stopped when the recording becomes re-openable, based on the stored address and count of the basic recording area, and continuing the recording on the disc at the located position.

The disc recording method/device may use wobble signals as clocks reproduced by the same number from the respective basic recording areas on the disc.

The disc-type recording medium under recording may employ sequential recording basically.

The disc recording method/device may further comprise the steps f/means for:

in order to continue the recording on the disc at the position located based on the stored address and count of the basic recording area, beforehand holding proper data in a data buffer corresponding to the basic recording area;

reading data corresponding to the located position from the data buffer; and continuing to record the data on the disc.

Each second basic recording area may be in a range correctable by an ECC (Error Correction Code) block added to data.

The disc recording method/device may further comprise the steps of/means for:

determining the period of clocks used for control of a record starting position in the basic recording area that a read error in reproduction produced due to a deviation between a recording stopping position and a record re-opening position which in turn is due to the accuracy of clocks used for control of the record starting position in the basic recording area is in a range of error correctability prescribed according to the disc standards; and eliminating the read error with the aid of the error correcting ability.

As described above, the disc device comprises basic clock counting means for starting to count basic clocks read from the disc at a starting point of a basic recording area, and repeating such counting operation for each basic recording area, and address holding means for holding an address of the basic recording area during recording. These means are placed in an operating state during recording. When the recording stops due to some external cause, the count indicated by the counting means at that time and the address held by the address holding means are saved. When the external cause has disappeared, the recording head is positioned at the head of the basic recording area where the recording stopped based on the address saved when the recording stopped. Then, the recording head is moved in the record advance direction and simultaneously the basic clocks to be read from the disc are counted by the basic clock counting-means, starting with the head of the unit area. When the number of basic clocks counted coincide with the count of basic clocks saved when the recording stopped, the recording head is driven to re-start the recording at the position where the recording stopped.

By applying the present invention to the disc device, recording is possible and startable at any position in any unit area within the basic recording area prescribed according to the disc standards.

Thus, even if the recording that basically comprises the sequential recording on the relevant disc-type recording medium cannot help stop due to some external cause, the recording is re-startable at the position where the recording stopped when the external cause has disappeared.

Thus, recording that basically comprises the sequential recording can be achieved on the relevant disc recording medium without re-recording the information from the beginning by erasing the information recorded before the recording stopped or without exchanging the disc used so far.

The real-time recording system using the disc device according to the present invention is capable of recording that basically comprises the sequential recording in a stabilized manner on the relevant disc-type recording medium.

BRIEF DESCRIPTION OF THE DRAWINGS

FIG. 2 is a timing chart explaining a general recording operation performed in the embodiment of the present invention.

FIG. 3 is a timing chart explaining an operation performed when the recording stops in the embodiment.

FIG. 4 is a timing chart showing re-opening of the recording after the recording stopped in the embodiment.

DESCRIPTION OF THE EMBODIMENTS

Figure 1:
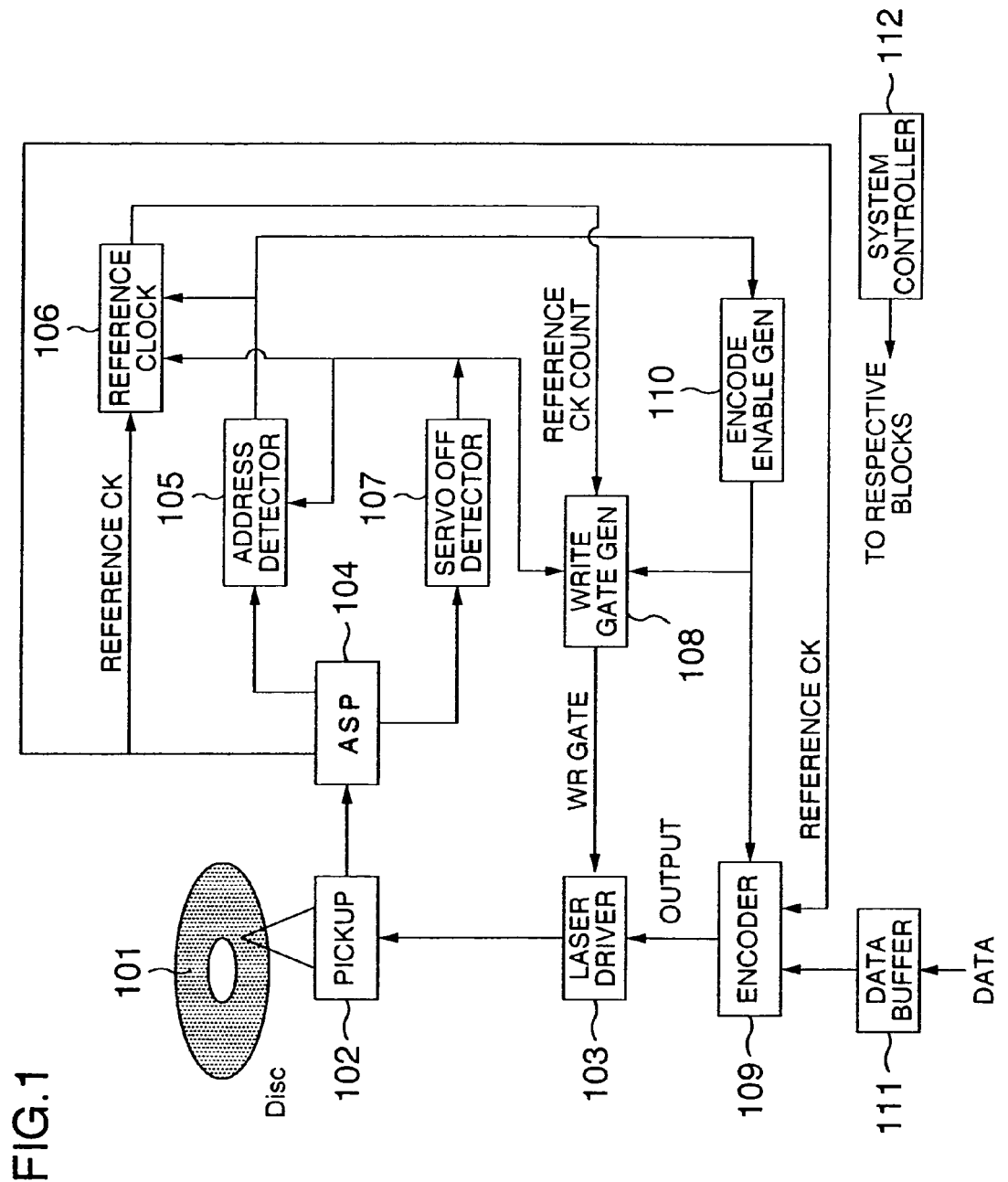
FIG. 1 is a block diagram showing a system of one embodiment according to the present invention.

FIG. 1 is a system block diagram showing an optical disc device as one embodiment of the present invention. In FIG.

1, reference numeral 101 denotes an optical disc; 102 an optical pickup unit; 103 a laser driver; 104 a front end; 105 an address detector; 106 a reference clock counter; 107 a servo off detector; 108 a write gate generator; 109 an encoder; 110 an encode enable generator; 111 a data buffer; and 112 a system controller.

The functions and specifications of the respective blocks will be described next. The optical disc 101 has a recording area separated into basic recording units each called a sector that is allocated an inherent address to specify the position of the sector. The address of the sector is detected when an optical spot passes the sector. When the light spot passes the respective sectors of the optical disc 101, the sectors reproduce the same number of wobble signals. Such specifications of the disc 101 are not special ones. For example, even in a general optical disc such as a DVD-RAM, DVD-R or DVD-R/W, user data is separated in units of 2048 bytes with each byte being recorded in a sector. Each sector has a structure having a pair of right and left undulations. When the light spot passes a track, the respective sectors obtain the same number of wobble signals.

The optical pickup unit 102 outputs to the optical disc 101 a laser beam for recording or reproduction on or from the optical disc 101, and produces a detection signal based on a reflection from the optical disc 101.

The laser driver 103 controls a waveform of a beam outputted from the pickup unit 102. In a reproduction mode, the laser driver 103 itself controls the beam waveform and in the recording mode, the laser driver controls the beam waveform based on the recording data to which the user data was converted by the encoder 109. Switching from the reproduction mode to the record mode is performed when a write gate signal is outputted from the write gate (WR gate) generator 108.

An analog signal processor (ASP) 104 outputs a disc control signal and a data reproducing signal based on the detection signal outputted by the optical pickup unit 102. In FIG. 1, the analog signal processor 104 outputs and sends an original address signal to the address detector 105. It also generates a reference clock based on a clock signal of a wobble signal and delivers it to the reference clock counter 106. It also delivers a servo signal to the servo off detector 107.

The address detector 105 verifies the original address signal outputted by the analog signal processor 104 and produces address information to be used in the system.

The reference clock counter 106 counts for each sector the number of reference clocks outputted by the analog signal processor 104. The count is reset at the starting point of each sector, and incremented each time a reference clock is produced. The position of the optical spot in the sector can be detected based on the count.

The servo off detector 107 determines that the servo has become disturbed when the level of a servo signal outputted by the front end analog signal processor 104 has reached a predetermined level, and produces a servo off detection signal.

The write gate generator 108 produces a write gate signal that permits the laser driver 103 to drive the laser in the recording mode. The conditions for producing the write gate signal are that an encode enable signal comprising a drive permission signal for the encoder is outputted by the encode enable generator 108 and that the number of reference clocks specified by the system controller 112 coincides with the count of the reference clocks outputted by the reference clock counter 106.

The encoder 109 converts the user data inputted to the disc device to data to be recorded on the optical disc 101, and outputs the converted data. The data conversion is performed in synchronism with a reference clock outputted by the analog signal processor 104 when an encode enable signal is outputted by the encode enable generator 110.

The encode enable generator 101 produces an encode enable signal that permits the encoder 109 to perform an encode process. The conditions for producing the encode enable signal are that the address specified by the system controller 112 coincides with the address outputted by the address detector 105.

The data buffer 111 temporarily holds the user data inputted to the disc device and adjusts the timing of inputting the user data to the disc device and the timing of recording the user data to the optical device 101.

The system controller 112 manages and controls the whole disc system. In FIG. 1, the connection of the system controller 112 with other functional blocks is omitted.

The real optical disc device has many other functional blocks, only the basic functional blocks of which the present embodiment need are described in FIG. 1.

Referring to FIGS. 2–4, operation of each of the blocks of the optical disc device of FIG. 1, and hence the operation of the present embodiment will be described next.

FIG. 2 illustrates an image appearing when recording is being performed on a sector of the optical disc 101 and a timing chart indicative of the outputs of the respective related blocks. In FIG. 2 reference numeral 201 denotes a record advance image in the recording sector where an optical spot is advancing from the starting point 202 to the end point 203 of the sector.

Reference numeral 204 denotes a reference clock produced by the analog signal processor 104 based on a wobble signal reproduced when the optical spot passes a relevant sector. FIG. 2 illustrates production of 16 reference clocks for each sector.

Reference numeral 205 represents the number of reference clocks 204 produced from the starting point 202 of the sector counted by the reference clock counter 106.

Reference numeral 206 represents an output from the encoder 109 and also illustrates that the encoder 109 is operating based on an encode enable signal output by the encode enable generator 110.

Reference numeral 207 denotes a write gate signal produced by the write gate generator 108 and also illustrates that the laser driver 103 has been set in a record mode. In FIG. 2, it is shown that the optical spot has advanced to a position 208 to thereby indicating that recording from the position 202 to the position 208 has ended, and also that the recording has smoothly advanced after the position 208.

FIG. 3 illustrates a record advance image and a timing chart where the recording has further advanced from the position 208 of FIG. 2, and where the servo becomes disturbed at a position 301 for some external cause, so that the recording has stopped. When the servo becomes disturbed, the servo off detector 107 outputs a servo off signal. The write gate generator 108 receives this signal to stop outputting a write gate signal, so that the operation of the laser driver 103 switches from the recording mode to the reproduction mode to thereby stop the recording. At this time, the system controller 112 saves address information detected by the address detector 105 and a count of 9 in the reference clock counter 106. This enables the position where the recording stopped to be specified.

When the recording stopped, the user data to be recorded in the sector is still stored in the data buffer 111. Thus, after the optical pickup unit 102 is positioned at the position where the recording stopped, the recording is re-openable.

FIG. 4 illustrates a recording image and a timing chart when the recording re-opens at the position where the recording stopped after the external cause that stopped the recording in FIG. 3 has disappeared. In order to re-open the recording, the optical pickup unit 102 need be positioned in the sector where the recording stopped. Since at this time the system controller 112 has therein saved the address information for the sector where the recording stopped, the optical pickup unit 102 can be positioned at the starting point of the sector where the recording stopped based on the saved address information. In the present embodiment the position where the recording stopped can be actually reached from the starting point of the sector based on the count "9" of the reference clocks saved when the recording stopped.

As an actual process, the system controller 112 sets the saved address information of the sector and the count of the reference clocks in the encode enable generator 110 and the write gate 108, respectively. The pickup unit 102 is then positioned at a sector present before the sector where the recording stopped. The address detector 105 then detects the address information of the sector which the optical spot scans. The encode enable generator 110 compares the address information set therein when the recording stopped with the detected address information. When the address information set when the recording stopped coincides with the address information outputted by the address detector 105, the encode enable generator 110 determines that the sector concerned is the one where the recording stopped, and outputs an encode enable signal. The encoder 109 receives this signal, converts the user data held in the data buffer 111 to recording data, and outputs this data, the timing of which is shown by 206 of FIG. 4. The encoder 109 starts to operate at the starting point 202 of the sector which the encode enable generator 110 determined to be the sector where the recording stopped. Since the position where the recording actually stopped is a position 301 of FIG. 4, the write gate generator 108 has not yet outputted a write gate signal at this time and hence the laser driver 103 has still been placed in the reproduction mode.

As the optical spot is further advanced from the starting point 202 of the sector to its end point 203, the analog signal processor 104 outputs reference clocks, which are then counted up by the reference clock counter 106. Simultaneously, the write gate generator 108 compares the count of the reference clocks "9" set in the write gate generator 108 when the recording stopped with the count outputted by the reference clock counter 106. When the optical spot advances to a position 401, the count of the reference clock counter 106 becomes 9, at which time this count coincides with the count of the reference clocks "9" set in the write gate generator 108 when the recording stopped. Thus, the write gate generator 108 determines that the position 401 is the one where the recording actually stopped, and outputs a write gate signal.

Reference numeral 207 of FIG. 4 illustrates a behavior of the write gate signal at that time. When the write gate signal is outputted, the operation of the laser driver 103 is set in the recording mode, so that the laser driver 103 controls a beam waveform of the optical pickup unit 102 based on the data outputted by the encoder 109 already under operation. Thus, the recording is re-openable at the position where the recording stopped. Since the actual position where the recording stopped is shown by 301 in FIG. 4, the disc area between the positions 301 and 401 where the recording stopped and re-opened, respectively, is overwritten with the input data starting at the position 301, which may produce a read error in the reproduction. However, the length of the overwritten data can be controlled to within a range of error correctability of the laser driver 103 by determining the magnitude and accuracy of the reference clocks based on the error correctability of the laser driver 103.

As described above, by sub-dividing a basic recording unit such as a sector in the disc device of the present embodiment, the record starting position is controllable in a more precise manner. Thus, even when the recording stops halfway during recording in a basic recording unit, the position where the recording stopped can be reached later and recording is re-openable at that position. Even when the recording that basically comprises sequential recording being performed on a relevant disc-type recording medium stops, the recording is re-openable at the position where the recording stopped. Thus, a disc device that basically employs sequential recording is realized in a real-time recording system for video or the like where the recorded data cannot be discarded, advantageously.

The invention claimed is:

1. A disc recording method comprising the steps of:
   dividing a first basic recording area on a disc that is a basic recording unit which is defined on the basis of standard or specifications of the disc and a position of which is specified on the disc by allocating an address thereto, into smaller units each being a second basic recording unit which is not provided in the standards or specifications of the disc; and
   controlling a recording start position on the disc by utilizing both of the first basic recording unit and the second basic recording unit.

2. A disc recording method according to claim 1 in which a reference for dividing the first basic recording unit into the second basic recording unit is based on clocks obtained from the first basic recording unit or clocks having multiplied or divided frequencies of the clocks obtained therefrom.

3. A disc recording method according to claim 1 in which when recording data of the second basic recording unit are erroneously read, a magnitude of the second basic recording unit is determined so that at least one of the recording data of the second basic recording unit is restored by means of error correction function of ECC (Error Correction Code) block to which the first basic recording unit belongs.

* * * * *